United States Patent
Martins et al.

(10) Patent No.: US 6,851,676 B2
(45) Date of Patent: Feb. 8, 2005

(54) INNER SEAL RING FOR ROLLING MILL OIL FILM BEARING

(75) Inventors: Armando S. Martins, Cumberland, RI (US); Dennis Shriner, Worcester, MA (US); Peter N. Osgood, Upton, MA (US)

(73) Assignee: Morgan Construction Company, Worcester, MA (US)

( * ) Notice: Subject to any disclaimer, the term of this patent is extended or adjusted under 35 U.S.C. 154(b) by 68 days.

(21) Appl. No.: 10/321,686

(22) Filed: Dec. 17, 2002

(65) Prior Publication Data

US 2004/0113367 A1 Jun. 17, 2004

(51) Int. Cl.[7] .................. F16J 15/32; F16C 33/76; B21B 31/07
(52) U.S. Cl. .................. 277/353; 277/552; 384/485; 72/247
(58) Field of Search .................. 277/352–353, 277/402, 551–552, 560, 562, 566; 72/236–237, 247; 384/485–486

(56) References Cited

U.S. PATENT DOCUMENTS

| | | | |
|---|---|---|---|
| 3,330,567 A | | 7/1967 | Mercer et al. |
| 4,165,881 A | * | 8/1979 | Salter .................. 277/425 |
| 4,234,196 A | * | 11/1980 | Iida .................. 277/565 |
| 4,389,053 A | * | 6/1983 | Innis et al. .................. 277/402 |
| 4,455,856 A | * | 6/1984 | Salter et al. .................. 72/236 |
| 4,586,720 A | * | 5/1986 | Simmons et al. .................. 277/565 |
| 5,478,090 A | * | 12/1995 | Simmons et al. .................. 277/423 |
| 6,053,501 A | * | 4/2000 | Innis et al. .................. 277/571 |
| 6,146,020 A | * | 11/2000 | Innis, Jr. .................. 384/486 |
| 6,334,615 B1 | * | 1/2002 | Uchiyama et al. .................. 277/376 |
| 6,575,471 B1 | * | 6/2003 | Grosspietsch et al. .................. 277/436 |

FOREIGN PATENT DOCUMENTS

| | | | | |
|---|---|---|---|---|
| FR | 2825301 | | 1/2001 | |
| GB | 2076481 | | 12/1981 | |
| GB | 2076481 A | * | 12/1981 | ............ F16J/15/32 |

* cited by examiner

*Primary Examiner*—Alison Pickard
*Assistant Examiner*—Vishal Patel
(74) *Attorney, Agent, or Firm*—Gauthier & Connors

(57) ABSTRACT

An inner seal ring is disclosed for use in an oil film bearing for a roll in a rolling mill. The roll has a neck with an intermediate section tapering from an end face to a reduced diameter end section contained within a sleeve. The sleeve is fixed in relation to the roll neck and is journalled for rotation in a bushing contained within a chock. A flexible neck seal is mounted on the intermediate section of the roll neck for rotation with the roll within a seal end plate fixed to the chock. The inner seal ring comprises a circular midsection with an annular face on one side and with inner and outer flanges projecting from an opposite side. The inner flange is configured to engage the neck seal, the outer flange is configured to coact in spaced relationship with the seal end plate to define a first labyrinth, and the annular face is contoured to coact in an abutting relationship with the roll end face in defining a second labyrinth.

2 Claims, 2 Drawing Sheets

INNER SEAL RING FOR ROLLING MILL OIL FILM BEARING

BACKGROUND DISCUSSION

1. Field of the Invention

This invention relates generally to oil film bearings for rotatably supporting the necks of rolls in a rolling mill, and is concerned in particular to an improved inner seal ring for the seal assemblies of such bearings.

2. Description of the Prior Art

Known seal assemblies for rolling mill oil film bearings are disclosed, for example, in U.S. Pat. No. 5,478,090 (Simmons et al.); U.S. Pat. No. 4,455,856 (Salter, Jr. et al.); and U.S. Pat. No. 4,389,053 (Innis Jr. et al.). These seal assemblies include inner seal rings configured to engage a flexible seal surrounding the roll neck and to coact with other seal components in defining a labyrinth designed to exclude cooling water and entrained dirt and mill scale from penetrating into the bearing. The inner seal rings are typically formed from aluminum and are provided with circumferentially spaced rubber bumpers arranged to abut an end face of the roll. The aluminum is easily damaged by being bent or dented, and its stiffness can disadvantageously deform the flexible neck seal. Moreover, the rubber bumpers create a space for water ingress between the inner seal ring and the roll end face.

SUMMARY OF THE INVENTION

In accordance with the present invention, the inner seal ring is integrally molded of a plastic material, with an annular face contoured to coact in an abutting relationship with the roll end face to define a second labyrinth for additionally impeding water ingress onto the bearing. The plastic material has increased resilience and flexibility, and as such is less likely to deform the neck seal, or to suffer damage by being dented or permanently bent out of shape.

These and other features and advantages of the present invention will now be described in greater detail with reference to the accompanying drawings, wherein:

DETAILED DESCRIPTION OF PREFERRED EMBODIMENT

Figure 1:
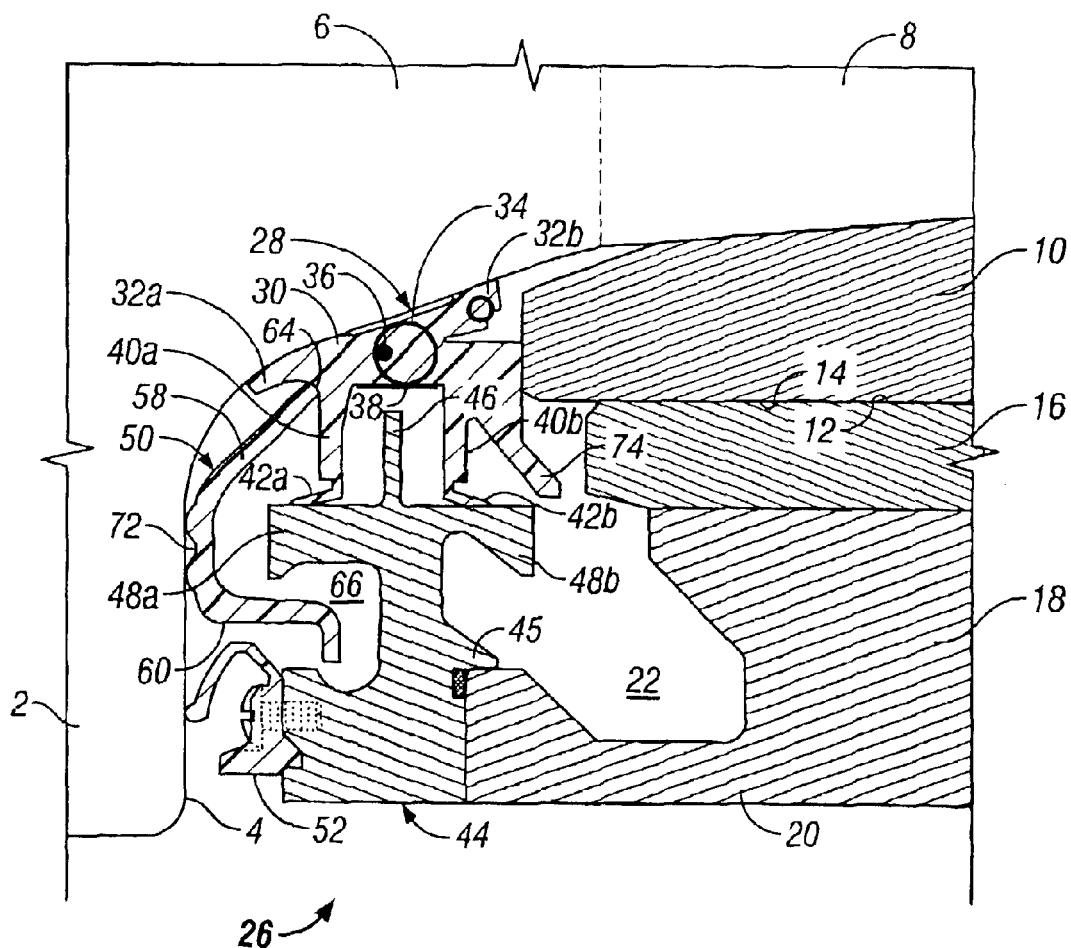
FIG. 1 is a cross-sectional view through a seal assembly embodying an inner seal ring in accordance with the present invention.

Referring now to the drawings, and with initial reference to FIG. 1, there is shown at 2 a roll having and end face 4 and a roll neck with a tapered intermediate section 6 leading to a more gradually tapered end section 8. A sleeve 10 is mounted on the tapered end section 8 and is fixed relative to the roll neck by conventional means (not shown) for rotation therewith. The sleeve 10 has an external bearing surface 14 journalled for rotation within an interior bearing surface 12 of a fixed bushing 16 enclosed by a chock 18. The sleeve 10 rotates with the roll while the chock 18 and the bushing 16 remain stationary. Oil is continuously supplied at a rate of flow sufficient to provide for a hydrodynamically maintained film between bearing surfaces 12, 14 at the bearing load zone. An axial extension 20 of the roll chock forms a sump 22 in which the oil emerging from between the bearing surfaces 12, 14 is continuously collected. The oil is drawn away from the sump through a suitable piping connection (not shown) to be recycled in the lubrication system of the mill.

Under so-called "wet" rolling applications, cooling water is continuously flooded over the roll 2 and down over its end face 4. In spite of the centrifugal forces which tend to throw the water off the roll, some of the water tends to work its way along the roll neck in the direction of the bearing. The objective of the seal assembly generally indicated at 26 and the flexible neck seal 28 which forms a part of the seal assembly, is to prevent the cooling water from reaching and contaminating the bearing oil while at the same time preventing loss of oil from the bearing.

The neck seal 28 includes a flexible circular seal body 30 with lips 32a, 32b in sealing contact with the tapered section 6 of the roll neck. The neck seal 28 is molded of a suitable resilient rubber-like material. Preferably, the seal body 30 is internally reinforced by an embedded combination of a coiled spring 34 and a steel cable 36 as described in U.S. Pat. No. 3,330,567.

The seal body 30 is encircled by a metal retaining band 38 which is parallel to the rotational axis of the roll 2 when the neck seal is in its mounted position as shown in FIG. 1. A pair of resilient inboard and outboard flanges 40a, 40b are integral with and extend radially outwardly from the seal body 30 at opposite ends of the retaining band 38. The flanges 40a, 40b are advantageously provided with angled oppositely facing lips 42a, 42b.

The seal assembly also includes a rigid seal end plate 44 having a circular body 45 fixed to the axial extension 20 of the chock 18. The seal end plate has a radially inwardly extending rigid flange 46 that is perpendicular to the rotational axis of the roll 2. The inner edge of flange 46 is spaced radially from the exterior surface of the retaining band 38 on the flexible seal body. The seal end plate further includes inboard and outboard shoulders 48a, 48b extending axially in opposite directions from the rigid flange 46. The shoulders 48a, 48b surround the resilient seal flanges 40a, 40b and are arranged to be sealingly contacted by the angled lips 42a, 42b.

The seal assembly 26 further includes a seal inner ring 50 in accordance with the present invention surrounded by a resilient water guard 52.

Figure 2:
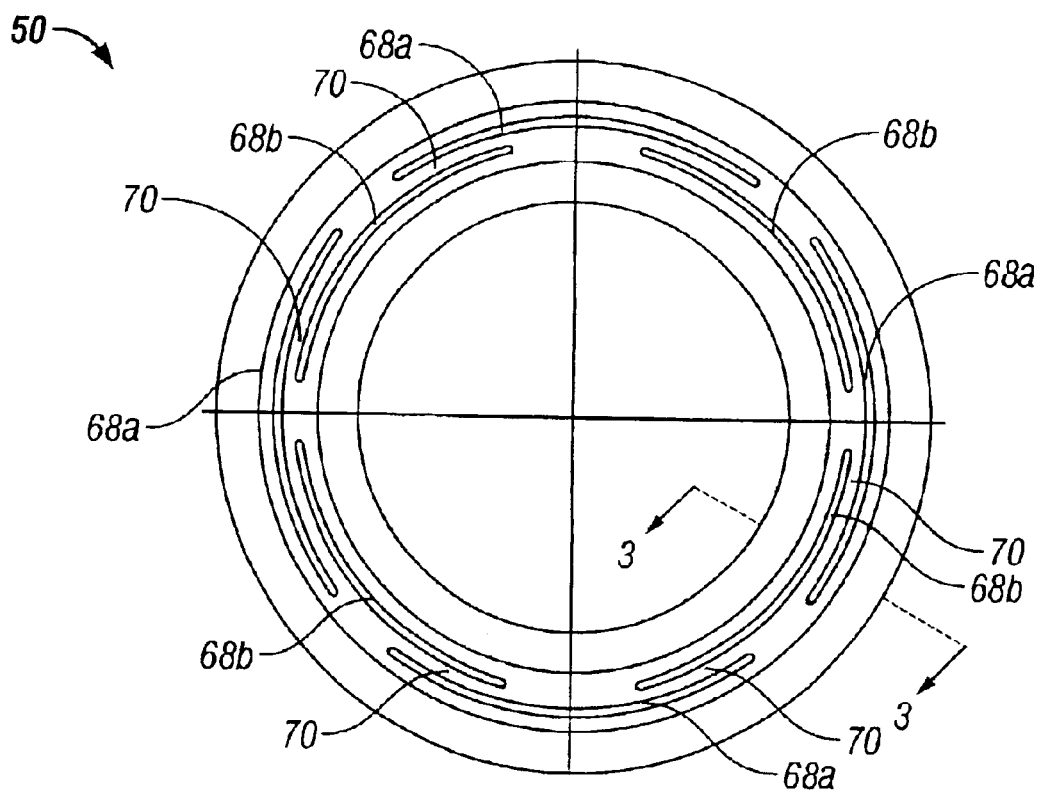
FIG. 2 is a side view of the inner seal ring showing its contoured annular face.
Figure 3:
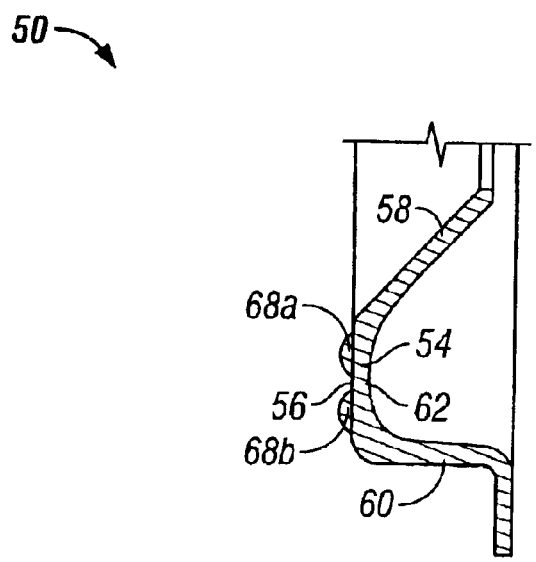
FIG. 3 is a sectional view on an enlarged scale taken along line 3—3 of FIG. 2.

With reference additionally to FIGS. 2 and 3, it will be seen that the inner seal ring 50 is molded from a plastic material, preferably a blend of polyimide and urethane or the like, and includes a circular midsection 54 with an annular face 56 on one side, and with inner and outer flanges 58, 60 projecting from an opposite side 62. As shown in FIG. 1, the inner flange 58 is configured to engage the neck seal 28 as at 64 and the outer flange 60 is configured to coact in spaced relationship with the seal end plate 44 in defining a first labyrinth 66.

The annular face 56 is contoured with concentric sets of partially circular ridges 68a, 68b. The ridges 68a, 68b are offset both radially and circumferentially, with their overlapped segments separated by grooves 70.

Again, as shown in FIG. 1, the ridges 68a, 68b are configured to coact in an abutting relationship with the roll end face 4 in defining a second labyrinth 72.

During a rolling operation, the inner seal ring 50, flexible neck seal 28 and sleeve 10 rotate with the roll, whereas the water guard 52, seal end plate 44, chock 18 and bushing 16 remain stationary.

Lubricating oil will constantly emerge from between the bearing surfaces 12, 14. Most of this oil will be turned back by a flinger 74 on the rotating neck seal and will thus be returned to the sump 22. Oil that succeeds in passing around the flinger 74 will be turned back by the sealing contact of the lip 42(*b*) of the outboard neck seal flange 40*b* with the outboard shoulder 48*b* of the seal end plate.

Most of the externally applied coolant will be deflected away from the bearing interior by the water guard 52. Any coolant that succeeds in penetrating by the water guard will be trapped in the first labyrinth 66 from which it will be drained via a drainage port (not shown) in the seal end plate 44.

The second labyrinth 72 formed by the ridges 68*a*, 68*b* and the roll end face 4 will serve to effectively prevent coolant from penetrating between the roll end face and the annular face 56 of the inner seal ring 50.

In light of the foregoing, it will now be apparent to those skilled in the art that various changes may be made to the embodiment herein chosen for purposes of disclosure, without departing from the scope of the claims appended hereto. By way of example only, the configuration, number and spacing of the ridges on the annular face 56 of the inner seal ring may be changed to suit particular bearing sizes and/or bearing applications. While the materials specified for the inner seal ring are preferred, other equivalent materials may be substituted.

We claim:

1. An inner seal ring for use in an oil film bearing for a roll in a rolling mill, said roll having a neck with an intermediate section tapering from an end face of the roll to a reduced diameter end section contained within a sleeve, the sleeve being fixed in relation to the neck and being journalled for rotation in a bushing contained within a chock, with a flexible neck seal mounted on the intermediate section of the roll neck for rotation with the roll within a seal end plate fixed to the chock, said inner seal ring comprising: a circular midsection with an annular face on one side and with inner and outer flanges projecting from an opposite side, said annular face having a plurality of ridges separated by grooves, said ridges being partially circular and offset both radially and circumferentially, said inner flange being configured to engage the neck seal, said outer flange being configured to coact in spaced relationship with the seal end plate to define a first labyrinth, and said ridges on said annular face being contoured to coact in an abutting relationship with the roll end face in defining a second labyrinth.

2. The inner seal ring of claim 1 wherein said circular midsection and said inner and outer flanges are integrally molded from a plastic material.

* * * * *